(12) United States Patent
Kobayashi

(10) Patent No.: US 11,982,343 B2
(45) Date of Patent: May 14, 2024

(54) STRAIN WAVE GEARING HAVING ROLLER-BEARING-TYPE WAVE GENERATOR

(71) Applicant: HARMONIC DRIVE SYSTEMS INC., Tokyo (JP)

(72) Inventor: Masaru Kobayashi, Azumino (JP)

(73) Assignee: HARMONIC DRIVE SYSTEMS INC., Tokyo (JP)

( * ) Notice: Subject to any disclaimer, the term of this patent is extended or adjusted under 35 U.S.C. 154(b) by 582 days.

(21) Appl. No.: 17/052,343

(22) PCT Filed: May 17, 2019

(86) PCT No.: PCT/JP2019/019787
§ 371 (c)(1),
(2) Date: Nov. 2, 2020

(87) PCT Pub. No.: WO2020/234945
PCT Pub. Date: Nov. 26, 2020

(65) Prior Publication Data
US 2023/0116162 A1    Apr. 13, 2023

(51) Int. Cl.
*F16H 49/00* (2006.01)
*F16C 19/26* (2006.01)

(52) U.S. Cl.
CPC .......... *F16H 49/001* (2013.01); *F16C 19/26* (2013.01); *F16H 2049/003* (2013.01)

(58) Field of Classification Search
CPC .... F16H 49/001; F16H 2049/003; F16H 1/32; F16H 55/08; F16C 17/04; F16C 17/18; F16C 33/26; F16C 19/26; F16C 19/50
See application file for complete search history.

(56) References Cited

U.S. PATENT DOCUMENTS

| | | | |
|---|---|---|---|
| 2007/0157760 A1* | 7/2007 | Kiyosawa | F16H 49/001 74/640 |
| 2015/0240928 A1* | 8/2015 | Jones | F16C 33/581 29/898.064 |
| 2016/0298746 A1* | 10/2016 | Kiyono | F16H 49/001 |

FOREIGN PATENT DOCUMENTS

| | | |
|---|---|---|
| JP | 2003176857 A | 6/2003 |
| WO | 9853224 A1 | 11/1998 |

(Continued)

OTHER PUBLICATIONS

International Search Report (PCT/ISA/210) dated Jul. 2, 2019, by the Japan Patent Office as the International Searching Authority for International Application No. PCT/JP2019/019787.

*Primary Examiner* — Victor L MacArthur
(74) *Attorney, Agent, or Firm* — BUCHANAN INGERSOLL & ROONEY PC

(57) ABSTRACT

A strain wave gearing has a wave generator provided with a plurality of rollers mounted between an ellipsoidal outer peripheral surface of a plug and an inner peripheral surface of an externally toothed gear. The plug is formed with recesses along the ellipsoidal outer peripheral surface. The recesses open in a first end surface of the plug facing toward a diaphragm of the externally toothed gear. The radial rigidity of the plug is relatively low in the side having the first end surface in the direction of a plug axis. When viewed along the direction of the plug axis, the respective rollers can be brought into linear contact with the inner peripheral surface of the externally toothed gear at positions on the long axis (Lmax) of the elliptically-flexed externally toothed gear, so as not to occur one-sided contact state.

6 Claims, 4 Drawing Sheets

(56) References Cited

FOREIGN PATENT DOCUMENTS

WO      2016079876 A1    5/2016
WO      2016129123 A1    8/2016

\* cited by examiner

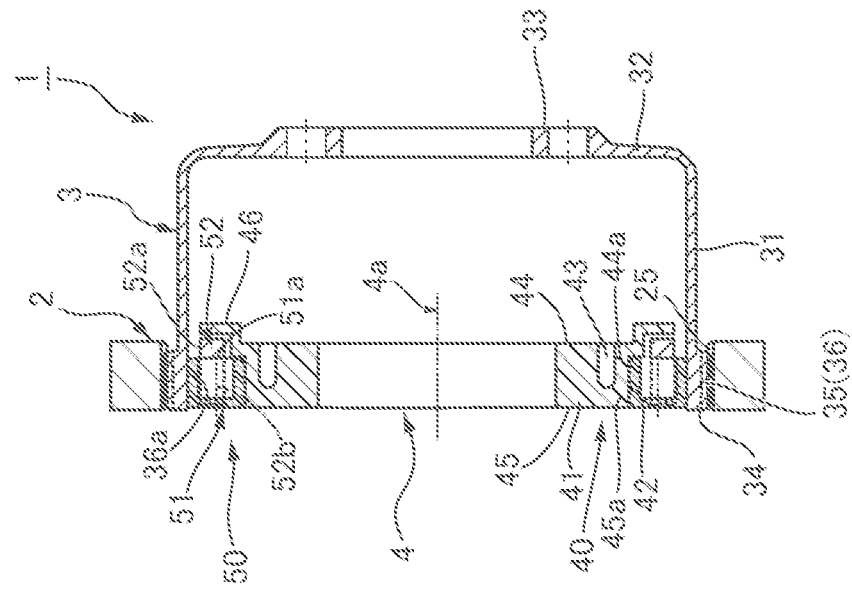

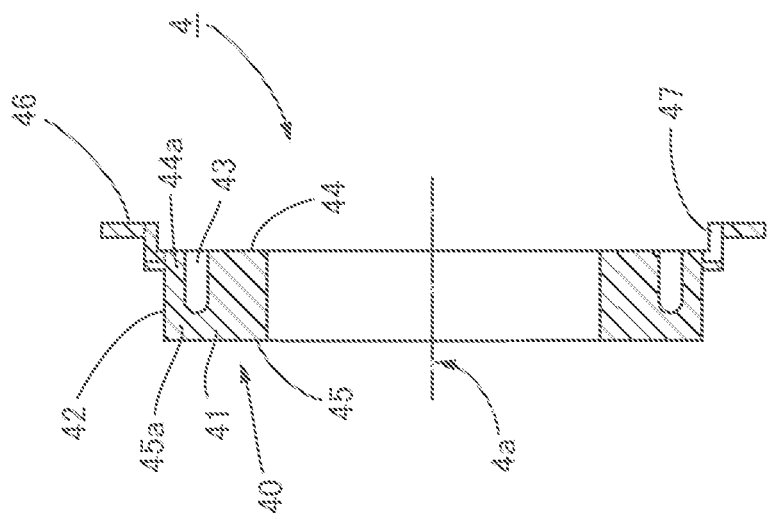
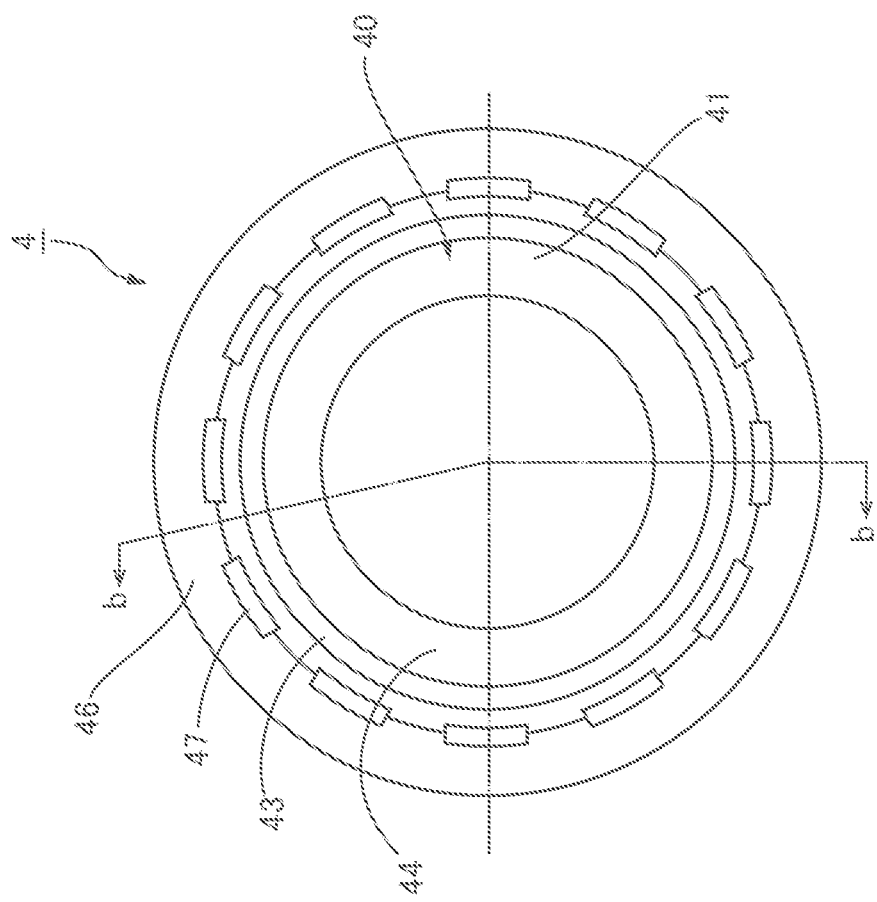

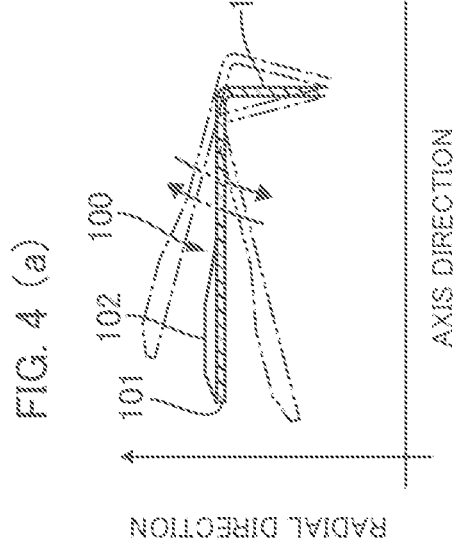
FIG. 4 (a)
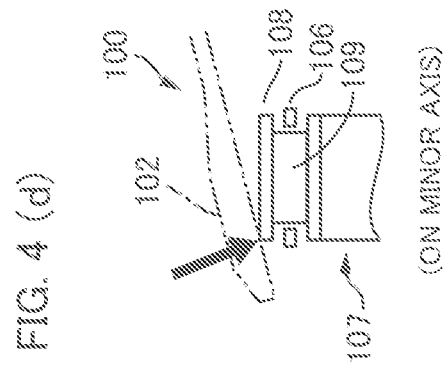
FIG. 4 (b) (ON MAJOR AXIS)
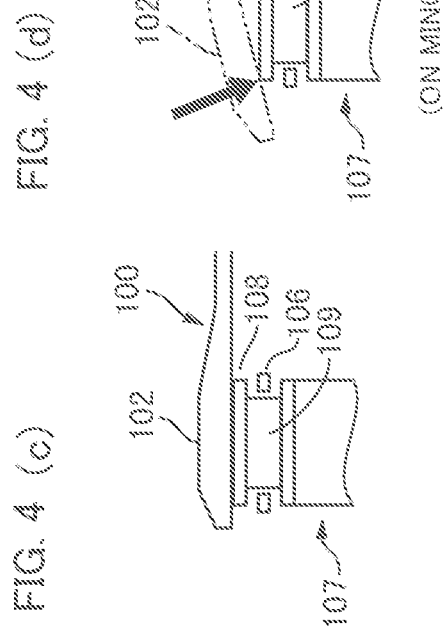
FIG. 4 (c)
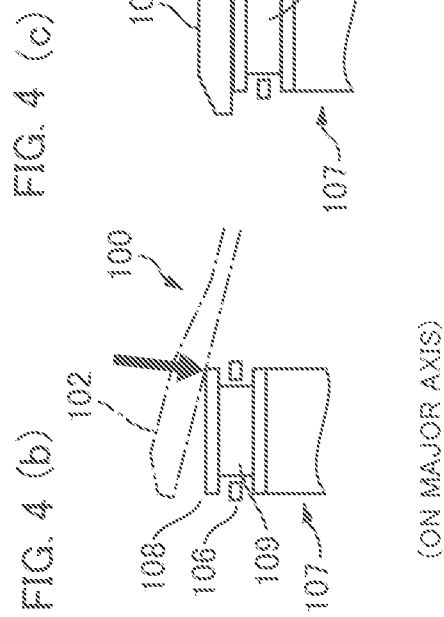
FIG. 4 (d) (ON MINOR AXIS)

STRAIN WAVE GEARING HAVING ROLLER-BEARING-TYPE WAVE GENERATOR

TECHNICAL FIELD

The present invention relates to a cup or top hat strain wave gearing having a roller-bearing-type wave generator.

BACKGROUND ART

In a cup strain wave gearing having a cup-shaped externally toothed gear or a top hat strain wave gearing having a top-hat-shaped externally toothed gear, the externally toothed gear undergoes three-dimensional flexure when an external teeth formation portion thereof is caused by a wave generator to flex into an ellipsoidal shape. FIG. 4(a) is an exaggerated explanatory drawing of a cup-shaped externally toothed gear caused to flex into an ellipsoidal shape. In this drawing, the solid lines show a state before deformation, the single-dashed lines show a deformed state in cross section including a long axis of the ellipsoid, and the double-dashed lines show the deformed state in cross section including a short axis.

In an externally toothed gear 100, an external teeth formation portion 102 on a side having an open end 101 is caused by a wave generator (not shown) to flex into an ellipsoidal shape. From the open end 101 to a diaphragm 103 an amount of flexure of the externally toothed gear 100 changes substantially in proportion to distance from the open end 101. The cylindrical external teeth formation portion 102 flexes radially outward on the long-axis side of the ellipsoidal shape as shown by the single-dashed lines, and flexes radially inward on the short-axis side of the ellipsoidal shape as shown by the double-dashed lines.

As the wave generator rotates, the external teeth formation portion 102 repeatedly flexes radially at individual positions along a circumferential direction thereof from a position shown by the single-dashed lines to a position shown by the double-dashed lines. The three-dimensionally flexed state of the externally toothed gear, which occurs as the wave generator rotates, is referred to as "coning," and a shape of this flexed state is referred to as a "coning shape."

Wave generators in which roller bearings are used are known as wave generators of strain wave gearings. In such configurations, an external peripheral portion 108 of a wave generator 107 is supported parallel to a direction of a center axis by rollers 109, as shown in FIGS. 4(b) to 4(d). FIG. 4(b) is an explanatory drawing of a state of a long-axis position, FIG. 4(c) is an explanatory drawing of a state of an intermediate position between the long-axis position and a short-axis position, and FIG. 4(d) is an explanatory drawing of a state of the short-axis position. In the case of the long-axis position of FIG. 4(b) and the case of the short-axis position of FIG. 4(d), but not in the case of the intermediate position of FIG. 4(c), the external peripheral portion 108 of the wave generator 107 cannot follow the coning shape of the external teeth formation portion 102.

Therefore, in an external peripheral surface of the wave generator 107 in which a roller bearing 106 is used, a contact location shifts to the diaphragm side on the long axis of the ellipsoidal shape of the externally toothed gear 100 as shown by the arrow in FIG. 4(b), and the contact location shifts to the open side on the short axis as shown by the arrow in FIG. 4(d). Particularly on and near the long-axis position where the externally toothed gear 100 meshes with an internally toothed gear, one-sided contact concurrent with a strong pressing force occurs due to a radial load. As a result, there is a worsening of angular transmission error and positioning accuracy, which are important characteristics of the strain wave gearing. A short life and wear of the strain wave gearing are also a concern.

The inventors have proposed, in Patent Document 1, a wave generator in which a roller bearing is used and which is able to follow three-dimensional flexure of a cup-shaped or top-hat-shaped externally toothed gear, and a strain wave gearing in which this wave generator is used. In this strain wave gearing, a circumferential length of an ellipsoidal external peripheral surface of a rigid plug of the wave generator is maintained while the ellipsoidal external peripheral surface assumes a reverse-tapered shape along an axis of the plug at a long-axis position and a short-axis position. Rollers of the roller bearing are thereby brought into contact with an internal peripheral surface of the externally toothed gear in a state conforming to the flexed shape thereof.

PRIOR ART LITERATURE

Patent Documents

Patent Document 1 WO 2016/079876 A1

SUMMARY OF THE INVENTION

Problems to be Solved by the Invention

As described above, the external peripheral surface of the wave generator in which a roller bearing is used comes into contact with the external teeth formation portion 102 of the externally toothed gear 100 with strong pressing force at a position shifted to the diaphragm side on the long axis of the ellipsoidal shape of the externally toothed gear 100, as shown by the arrow in FIG. 4(b). Therefore, one-sided contact must be prevented between the external peripheral surface of the wave generator and the internal peripheral surface of the externally toothed gear on and near the long-axis position where the externally toothed gear meshes with the internally toothed gear.

It is an object of the present invention to provide a strain wave gearing having a roller-bearing-type wave generator in which rollers of a roller bearing can be appropriately brought into contact, without one-sided contact, with an internal peripheral surface of an externally toothed gear on and near a long-axis position where the ellipsoidally flexed externally toothed gear meshes with an internally toothed gear, without giving a tapered shape to an ellipsoidal external peripheral surface of a plug of a wave generator.

Means to Solve the Problems

The present invention provides a strain wave gearing in which a flexible externally toothed gear having a cup shape or a top hat shape is caused to flex into an ellipsoidal shape by a roller-bearing-type wave generator and partially meshes with a rigid internally toothed gear, wherein the wave generator is provided with a plug having an ellipsoidal external peripheral surface and a roller bearing that is mounted between the ellipsoidal external peripheral surface of the plug and an internal peripheral surface of a cylindrical barrel part of the externally toothed gear and that supports the externally toothed gear so as to allow rotation relative to the plug, and a recess (thinned part) extending in an annular shape or an ellipsoidal shape along the ellipsoidal external peripheral surface is formed in the plug. Designating end surfaces of the plug on both sides in a plug axis direction as first and second end surfaces, the recess opens on the first end surface, which faces toward the diaphragm side of the externally toothed gear, and the recess has a predetermined width in a radial direction of the plug and a predetermined depth from the first end surface to the second end surface.

The cylindrical barrel part, where external teeth of the externally toothed gear are formed, is caused to flex into an ellipsoidal shape by the ellipsoidal external peripheral surface of the plug of the wave generator. The radial-direction rigidity of the plug, in the plug axis direction, is relatively low in the side having the first end surface onto which the recess opens and is relatively high in the side having the second end surface. Using the difference in rigidity in the plug axis direction, the rollers of the roller bearing can be brought into linear contact with the internal peripheral surface of the externally toothed gear at long-axis positions of the ellipsoidally flexed externally toothed gear when viewed along the axial direction, so as to not be in a state of one-sided contact.

Cylindrical or cup-shaped rollers can be used as rollers of the roller bearing. When cup-shaped rollers are used, the rollers are aligned in a state such that the open ends of the cup shapes face toward the diaphragm side of the externally toothed gear. The diameter-direction rigidity of the rollers is relatively low on the open-end sides and is relatively high on the opposite-side ends, when viewed along the axial direction of the rollers. Using the difference in axial-direction rigidity of the rollers, the rollers can be brought into linear contact with the internal peripheral surface of the externally toothed gear at the long-axis positions of the ellipsoidally flexed externally toothed gear, so as to not be in a state of one-sided contact.

The roller bearing could also be provided with a retainer for retaining the rollers in positions at equal angular intervals in a circumferential direction. In such instances, a large-diameter brim part could be formed in an edge end part of the ellipsoidal external peripheral surface of the plug as a retainer restraint for inhibiting axial movement of the retainer. When a large-diameter brim part is formed along the edge end part on the first-end-surface side in the ellipsoidal external peripheral surface of the plug, it is preferable that the brim part be appropriately formed so that it is possible to minimize any increase in radial rigidity in the first-end-surface side, which results from providing the brim part. For example, arcuate cut-away portions are formed in the brim part at equal angular intervals along the circumferential direction to reduce the radial-direction rigidity of the brim part. It is thereby possible to minimize the increase in radial-direction rigidity of the plug resulting from providing the brim part to the plug.

BRIEF DESCRIPTION OF THE DRAWINGS

FIG. 1(a) is a schematic end surface view of a cup strain wave gearing according to an embodiment of the present invention, and FIG. 1(b) is a schematic cross-sectional view of the same;

FIG. 2(a) is a schematic end surface view of a plug of a wave generator, and FIG. 2(b) is a schematic cross-sectional view of the same;

FIG. 4(a) is an explanatory drawing of a flexed state of a cup strain wave gearing, and FIGS. (b) to (d) are each an explanatory drawing of a state of contact between a wave generator and an externally toothed gear.

MODE FOR CARRYING OUT THE INVENTION

Figure 3:
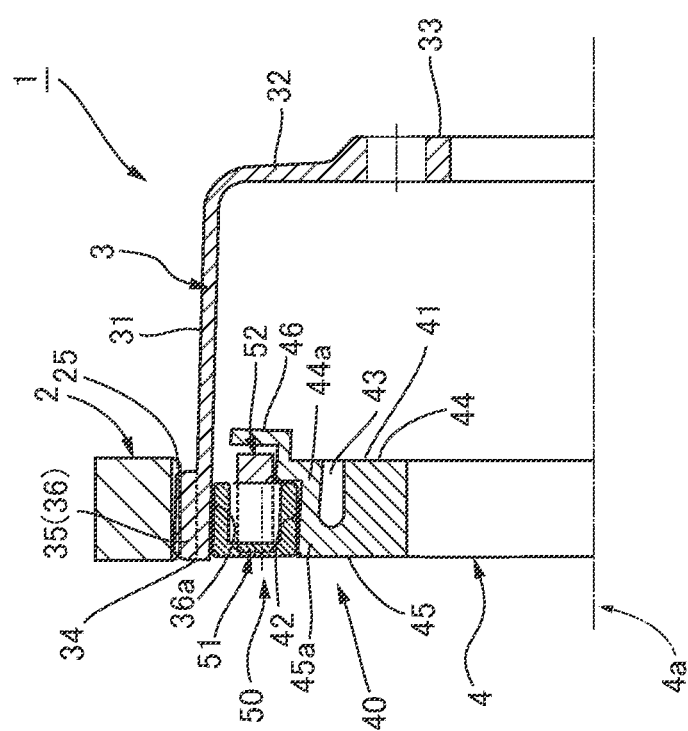
FIG. 3 is an explanatory drawing for depicting a state of contact between an externally toothed gear and a wave generator at a long-axis position in an ellipsoidally flexed externally toothed gear.

Below is a description, made with reference to the drawings, of an embodiment of a strain wave gearing to which the present invention is applied.

FIG. 1(a) is a schematic end surface view of a cup strain wave gearing according to the embodiment, and FIG. 1(b) is a schematic longitudinal cross-sectional view of the same. The cup strain wave gearing 1 is provided with an annular rigid internally toothed gear 2, a cup-shaped flexible externally toothed gear 3 disposed concentrically on an inner side of the internally toothed gear, an ellipsoidally contoured wave generator 4 fitted into an inner side of the externally toothed gear.

The externally toothed gear 3 is provided with a cylindrical barrel part 31, an annular diaphragm 32 continuous with one axial-direction end of the cylindrical barrel part 31, a discoidal boss 33 integrally formed on a center portion of the diaphragm 32, and external teeth 35 formed on an external peripheral surface portion of the cylindrical barrel part 31 on a side that has an open end 34, which is the other end in the axial direction. An external teeth formation portion 36 where the external teeth 35 are formed in the cylindrical barrel part 31 is caused to flex into an ellipsoidal shape by the wave generator 4, and external teeth 35 positioned on and near a long axis Lmax of the external teeth formation portion 36 mesh with internal teeth 25 of the internally toothed gear 2.

The wave generator 4 is provided with a rigid plug 40 and a roller bearing 50 mounted on an ellipsoidal external peripheral surface 42 of the plug 40. The plug 40, via the roller bearing 50, supports the external teeth formation portion 36 of the externally toothed gear 3 in a state enabling relative rotation. When the wave generator 4 is caused to rotate by a motor, etc., the meshing positions of the gears 2, 3 move in a circumferential direction. The difference in the number of teeth between the gears 2, 3 is 2n (n being a positive integer), and while the wave generator 4 undergoes one rotation, relative rotation occurs between the gears 2, 3 at an angle corresponding to the difference in the number of teeth.

FIG. 2(a) is a schematic end surface view of the plug 40 of the wave generator 4, and FIG. 2(b) is a schematic cross-sectional view of a portion sectioned along a line b-b in FIG. 2(a). Referring to FIGS. 1 and 2, the plug 40 of the wave generator 4 is provided with an annular plug body 41, and the ellipsoidal external peripheral surface 42 is formed on an external peripheral surface of the plug body 41. An annular or ellipsoidal recess 43 (thinned part) extending along the ellipsoidal external peripheral surface 42 is formed in the plug body 41.

One end surface of the plug body 41 along a direction of a plug axis 4a is designated as a first end surface 44, and the other end surface is designated as a second end surface 45. The first end surface 44 is an end surface that faces toward the side of the diaphragm 32 when the wave generator 4 has been mounted on the externally toothed gear 3. In the first end surface 44, the recess 43 opens at a position that is radially inward apart from the ellipsoidal external peripheral surface 42. The recess 43 has a fixed width in the radial direction, and a fixed depth from the first end surface 44 toward the second end surface 45. A portion of the plug body 41 on the side having the first end surface 44 is divided in the radial direction by the recess 43, and a portion on the side having the second end surface 45 remains connected in the radial direction. Therefore, in a plug-outer-peripheral portion where the ellipsoidal external peripheral surface 42 is formed, a portion 44*a* on the side having the first end surface 44 is a thin portion of low radial thickness due to the recess 43, and a portion 45*a* on the side having the second end surface 45 is a thick portion. In other words, the radial rigidity of the plug body 41 is relatively low in the side having the first end surface 44 where the thin portion 44*a* is formed and is relatively high in the side having the second end surface 45 where the thick portion 45*a* is formed.

The roller bearing 50, which is mounted on the ellipsoidal external peripheral surface 42 of the plug body 41, is provided with numerous rollers 51, a retainer 52, and a retainer restraint 46. The rollers 51 are rollably mounted between the ellipsoidal external peripheral surface 42 of the plug 40 and an internal peripheral surface 36*a* of the external teeth formation portion 36 of the externally toothed gear 3. The rollers 51 are cylindrical rollers of which one end in a roller axis direction is closed off and the other end is an open end 51*a*; i.e., cup-shaped rollers. The rollers 51 are aligned so that the open ends 51*a* face toward the diaphragm of the externally toothed gear 3. Cylindrical rollers closed off at both ends can also be used as the rollers 51.

The retainer 52 retains the rollers 51 in positions at equal angular intervals in the circumferential direction. The retainer 52 has a common structure and is provided with an annular part 52*a* and partitioning parts 52*b* extending in the axial direction at equal angular intervals from an annular end surface of the annular part 52*a*, and roller-insertion pockets are formed between adjacent partitioning parts 52*b*. The retainer restraint 46 restrains axial movement of the retainer 52 so that the retainer 52 does not axially separate from the rollers 51.

The retainer restraint 46 of the present example is a brim part formed integrally on an end edge part of the ellipsoidal external peripheral surface 42 of the plug body 41, on the side having the first end surface 44. The retainer restraint 46 has cut-away parts 47 at equal angular intervals along the end edge part. The cut-away parts 47 each have an arc shape of fixed width and fixed depth. Providing the cut-away parts 47 minimizes any increase in radial rigidity of the plug in the side having the first end surface 44, this increase resulting from the retainer restraint 46 being formed integrally on the plug body 41.

FIG. 3 is an explanatory drawing of a state of contact between the externally toothed gear 3 and the wave generator 4 at a position on a long axis Lmax (see FIG. 1) in the ellipsoidally flexed the externally toothed gear 3. At the position on the long axis Lmax, the portion of the externally toothed gear 3 on the side having the diaphragm 32 is strongly pressed against the rollers 51 of the roller bearing 50 due to coning. The recess 43 is formed in the plug body 41 supporting the rollers 51. An external peripheral portion of the plug body 41 where the ellipsoidal external peripheral surface 42 is formed has relatively low rigidity in a portion on the side having the first end surface 44 in the direction of the plug axis 4*a*.

Due to a radial load resulting from load torque from the side having the externally toothed gear 3, the thin portion 44*a* in the external peripheral portion of the plug body 41, on the side having the first end surface 44 (the side having the diaphragm 32), slightly deforms radially inward. The ellipsoidal external peripheral surface 42 of the plug body 41 also deforms so as to have a shape conforming to the flexed shape of the external teeth formation portion 36 of the externally toothed gear 3. Between the external teeth formation portion 36 of the externally toothed gear 3 and the ellipsoidal external peripheral surface 42 of the plug body 41, the rollers 51 come to be in a state of linear contact, without falling into a state of one-sided contact, with both the internal peripheral surface 36*a* of the externally toothed gear 3 and the ellipsoidal external peripheral surface 42 of the plug 40.

Near the long axis, the ellipsoidal external peripheral surface 42 of the plug 40 in contact with the rollers 51 deforms, and equivalent radius of curvature of the portions of the ellipsoidal external peripheral surface 42 that are in linear contact with the rollers 51 increases. A decrease in Hertzian contact stress can thereby also be expected.

The plug body 41 and the rollers 51 can be manufactured from steel, non-ferrous metal, plastic, or various other materials. The shape of the recess 43 formed in the plug body 41 and the cup shape of the rollers 51 should be appropriately set in accordance with mechanical characteristics of these materials, the radial load occurring between the externally toothed gear and the wave generator, etc.

The invention claimed is:

1. A strain wave gearing, comprising:
a rigid internally toothed gear;
a flexible externally toothed gear disposed concentrically on an inner side of the internally toothed gear; and
a wave generator disposed concentrically on an inner side of the externally toothed gear, to cause the externally toothed gear to flex into an ellipsoidal shape and partially mesh with the internally toothed gear,
wherein
the externally toothed gear is provided with:
a cylindrical barrel part capable of flexing in a radial direction;
a diaphragm extending radially outward or inward from one end of the cylindrical barrel part;
external teeth formed in an externally peripheral surface portion at a side having another end of the cylindrical barrel part,
wherein
the wave generator is provided with:
a plug having an ellipsoidal external peripheral surface for flexing the cylindrical barrel part, where the external teeth are formed, into an ellipsoidal shape; and
a roller bearing that is mounted between the ellipsoidal external peripheral surface of the plug and an internal peripheral surface of the cylindrical barrel part of the externally toothed gear and that supports the externally toothed gear so as to allow rotation relative to the plug,
the roller bearing being provided with rollers having a cup shape,
the plug being formed with a recess extending in an annular shape or an ellipsoidal shape proximate the ellipsoidal external peripheral surface, and
wherein
end surfaces of the plug on both sides in a plug axis direction are designated as first and second end surfaces,
the recess opens on the first end surface, which faces toward a side of the diaphragm of the externally toothed gear; and
the recess has a predetermined width in a radial direction of the plug and a predetermined depth from the first end surface toward the second end surface, whereby a radial-direction rigidity of the plug is lower in a side having the first end surface onto which the recess opens than in a side having the second end surface, and the rollers are aligned so that an open end of the cup shape thereof faces toward the diaphragm of the externally toothed gear.

2. The strain wave gearing according to claim 1, wherein the roller bearing is provided with the rollers that are aligned in a state being in direct contact with the ellipsoidal external peripheral surface of the plug and an inner peripheral surface of the cylindrical barrel part of the externally toothed gear, respectively.

3. The strain wave gearing according to claim 2, wherein the roller bearing is provided with a retainer for retaining the rollers in positions at equal angular intervals;
the plug is formed with a brim part proximate an edge end part of the ellipsoidal external peripheral surface of the plug to inhibit axial movement of the retainer; and
the brim part is formed with cut-away portions at equal angular intervals along the edge end part.

4. A strain wave gearing, comprising:
a rigid internally toothed gear;
a flexible externally toothed gear disposed concentrically on an inner side of the internally toothed gear; and
a wave generator disposed concentrically on an inner side of the externally toothed gear, to cause the externally toothed gear to flex into an ellipsoidal shape and partially mesh with the internally toothed gear,
wherein
the externally toothed gear is provided with:
a cylindrical barrel part capable of flexing in a radial direction;
a diaphragm extending radially outward or inward from one end of the cylindrical barrel part;
external teeth formed in an externally peripheral surface portion at a side having another end of the cylindrical barrel part,
wherein
the wave generator is provided with:
a plug having an ellipsoidal external peripheral surface; and
a roller bearing that is mounted between the ellipsoidal external peripheral surface of the plug and an internal peripheral surface of the cylindrical barrel part of the externally toothed gear and that supports the externally toothed gear so as to allow rotation relative to the plug,
the plug being formed with a recess extending in an annular shape or an ellipsoidal shape proximate the ellipsoidal external peripheral surface, and
wherein
end surfaces of the plug on both sides in a plug axis direction are designated as first and second end surfaces,
the recess opens on the first end surface, which faces toward a side of the diaphragm of the externally toothed gear,
the recess has a predetermined width in a radial direction of the plug and a predetermined depth from the first end surface toward the second end surface,
the roller bearing is provided with rollers having a cup shape, and
the rollers are aligned so that an open end of the cup shape thereof faces toward the diaphragm of the externally toothed gear.

5. The strain wave gearing according to claim 4, wherein the rollers are aligned in a state of being in direct contact with the ellipsoidal external peripheral surface of the plug and an inner peripheral surface of the cylindrical barrel part of the externally toothed gear, respectively.

6. The strain wave gearing according to claim 5, wherein the roller bearing is provided with a retainer for retaining the rollers in positions at equal angular intervals;
the plug is formed with a brim part proximate an edge end part of the ellipsoidal external peripheral surface thereof of the plug to inhibit axial movement of the retainer; and
the brim part is formed with cut-away portions at equal angular intervals along the edge end part.

* * * * *